3,400,144
BASIC COPPER-(II)-SALTS OF
ALKYLSULFURIC ACIDS
Otto Scherer, Bad Soden, Taunus, and Konrad Albrecht, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 7, 1965, Ser. No. 470,222
Claims priority, application Germany, July 23, 1964, F 43,531, F 43,532
2 Claims. (Cl. 260—438.1)

ABSTRACT OF THE DISCLOSURE

Fungicides of the general formula

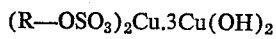

$(R-OSO_3)_2Cu \cdot 3Cu(OH)_2$ in which R stands for a straight chain or branched alkyl radical with 8 to 18 carbon atoms have been disclosed. Representative examples are basic copper-(II)-n-dodecyl sulfate and basic copper-(II)-n-octadecyl sulfate.

---

The present invention relates to the preparation and application of novel, fungicidally active, basic copper-(II)-salts of alkylsulfuric acids of the general formula

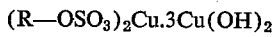

$(R-OSO_3)_2Cu \cdot 3Cu(OH)_2$ in which R stands for a straight chain or branched alkyl radical with 8 to 18 carbon atoms.

The novel salts are prepared by reacting the appropriate alkylsulfuric acids with the calculated amount of freshly precipitated, thoroughly washed copper hydroxide.

The aforesaid alkylsulfuric acids can be obtained from olefins or alcohols according to customary methods. The reaction with copper hydroxide is brought about while vigorously stirring and at a temperature in the range of from 0 to 100° C., preferably 0 to 60° C.

The basic copper salts according to the invention are isolated by suction filtration or centrifugation and then dried.

Since long it has been known to use sparingly soluble copper salts for combating noxious fungi on plants. In many cases so-called Bordeaux mixtures and copper oxychloride are used. The former have the disadvantage that these must be prepared at the place of application. Recently, other copper compounds have been used, for example copper salts of aliphatic and aromatic sulfonic acids and tetracopper calcium oxychloride.

All these compounds are phytotoxic and, moreover, their application leads in most cases to the so-called copper shock, involving a growth depression of the treated plants.

The novel compounds are used as active ingredient in fungicidal compositions. They are even active in a very low concentration, for example when used in viniculture, and they do not bring about a copper shock.

The products according to the invention are used as active ingredient in the customary formulations, for example aqueous suspensions of a wettable powder, if desired in admixture with other pesticides or fertilizers. They are characterized by a high fungicidal action and an excellent tolerableness towards plants. It is surprising that the novel compounds are, for example, more effective against Peronospora than a comparable agent on the basis of copper oxychloride, although the latter has a considerably higher copper content than the novel compounds.

In addition to the fungicidal agents, the formulations may contain inert substances, diluting, wetting and dispersing agents, grinding auxiliaries, adhesives and adsorption agents.

The following examples serve to illustrate the invention but they are not intended to limit it thereto.

Example 1.—Basic copper-(II)-n-octyl sulfate 116.5 grams of chlorosulfonic acid (1 mole) were added, while stirring and over a period of about 30 to 45 minutes, to a solution of 130.3 grams of n-octanol-1 (1 mole) in 50 milliliters of choloroform to which one drop of pyridine had been added. The temperature was maintained at 30–35° C. After a further 30 minutes the residual hydrogen chloride was removed from the octylsulfuric acid formed by passing dry air or nitrogen through the reaction mixture for 2 hours.

The octylsulfuric acid was taken up in ice water and then added within one hour, while vigorously stirring at room temperature, to an aqueous suspension of freshly precipitated copper hydroxide which had repeatedly been washed with water until it was practically free from ions.

The copper hydroxide had been prepared by reacting a solution of 341 grams of $CuCl_2 \cdot 2H_2O$ or 500 grams of $CuSO_4 \cdot 5H_2O$ (2 moles) in 2 liters of water with a solution of 160 grams of sodium hydroxide (4 moles) in 3 liters of water at 10–20° C. and while vigorously stirring.

In the reaction of octylsulfuric acid with copper hydroxide the temperature did not rise to an essential extent. The reaction mixture was stirred for about 2 hours at room temperature until the suspension had turned uniformly blue-green, the colour of the basic salt, and then filtered off with suction. The salt was washed once with water and dried at 60–80° C. under reduced pressure.

367 grams of basic salt were obtained (theoretical yield 387 grams) having a molecular weight of 774.6.

$(C_8H_{17}OSO_3)_2Cu \cdot 3Cu(OH)_2$—Found: 33.1% of copper. Calculated: 32.9% of copper.

Example 2.—Basic copper-(II)-n-dodecyl sulfate 186.4 grams of n-dodecanol-1 (1 mole) were reacted as described in Example 1. 410 grams of basic salt were obtained (theoretical yield 443 grams) having a molecular weight of 886.6.

$(C_{12}H_{25}OSO_3)_2Cu \cdot 3Cu(OH)_2$—Found: 30.5% of copper. Calculated: 29.4% of copper.

Example 3.—Basic copper-(II)-n-octadecyl sulfate 270 grams of n-octadecanol-1 (1 mole) were dissolved while heating at 50° C. in 50 milliliters of chloroform to which 0.5 milliliter of pyridine had been added. 116.5 grams of chlorosulfonic acid (1 mole) were added within 30 minutes at 50–55° C. while vigorously stirring. For avoiding solidification of the mixture the temperature was maintained at 55° C. One hour after the addition of chlorosulfonic acid, air or nitrogen were introduced into the reaction mixture in order to remove the hydrogen chloride formed.

The mixture obtained was poured into 2 liters of ice water, whereby a gel-like suspension of octadecylsulfuric acid was obtained.

The suspension obtained was added, at 60° C. and while vigorously stirring, to a suspension of copper hydroxide prepared as described in Example 1. After having stirred for 3 hours the reaction product was filtered off with suction, washed once with water and dried at 70° C. under reduced pressure.

480 grams of basic copper-(II)-n-octadecyl sulfate were obtained (theory 527 g.) having a molecular weight of 1054.2.

$(C_{18}H_{37}OSO_3)_2Cu \cdot 3Cu(OH)_2$—Found: 24.5% of copper. Calculated: 24.2% of copper.

Example 4

Vines which had been uniformly cultivated in a greenhouse were treated four times with aqueous suspensions of varying concentrations prepared from a wettable powder consisting of 50% of one of the following active ingredients:

basic copper-(II)-n-octyl sulfate (A)
basic copper-(II)-n-octadecyl sulfate (B)
basic copper-(II)-n-dodecyl sulfate (C),

|  | Percent |
|---|---|
| Chalk | 29 |
| Dried sulfite cellulose waste liquor | 15 |
| Active silicic acid | 1.5 |
| Cyclohexanol | 1.5 |
| Polyvinyl alcohol 70/88 | 2 |
| Oleyl methyl tauride | 1 |

Directly after drying of the spray liquor the plants were heavily infested with zoosporangiums of Peronospora. After a time of incubation of 7 days the degree of infestation of the plants with the fungus was determined in comparison with plants treated with a commercial wettable powder of copper oxychloride containing 50% of Cu.

INFESTATION WITH PERONOSPORA IN PERCENT

| Active ingredient, mg./litre of spray liquor | 500 mg./l., percent | 250 mg./l., percent | 125 mg./l., percent | 60 mg./l, percent | 30 mg./l., percent | 15 mg./l., percent |
|---|---|---|---|---|---|---|
| Preparation A | 0.009 | 0.4 | 12 | 21 | 34 | 32 |
| Preparation B | 0 | 0.6 | 3.4 | 34 | 53 | 68 |
| Preparation C | 0 | 0 | 0.4 | 6.1 | 17 | 57 |
| Copper oxychloride | 34 | 57 | 67 | 100 | 100 | 100 |
| Control | 100 | 100 | 100 | 100 | 100 | 100 |

Example 5

In order to test the effectiveness of the claimed compounds over a prolonged period of time they were applied to vines in the form of aqueous suspensions of wettable powders having the compositions as defined in Example 4. After the treatment the plants were brought into a green house and heavily infested after 4 weeks with a suspension of zoosporangiums of Peronospora. After a time of incubation of 7 days the degree of infestation was determined in comparison to untreated but infested plants.

INFESTATION WITH PERONOSPORA IN PERCENT

| Active ingredient, mg./litre of spray liquor | 500 mg./l., percent | 250 mg./l., percent | 125 mg./l., percent | 60 mg./l., percent |
|---|---|---|---|---|
| Preparation A | 1.3 | 6.6 | 13 | 41 |
| Preparation B | 2.1 | 8.4 | 28 | 58 |
| Preparation C | 0.3 | 1.8 | 6.4 | 24 |
| Copper oxychloride | 18 | 54 | 55 | 100 |
| Control | 100 | 100 | 100 | 100 |

We claim:
1. Basic copper-(II)-n-dodecyl sulfate.
2. Basic copper-(II)-n-octadecyl sulfate.

References Cited

UNITED STATES PATENTS 2,052,027  8/1936  Harris _____ 260—438.1 XR
3,133,946  5/1964  Maurer et al. __ 260—438.1 XR
3,176,033  3/1965  Guyot et al. _____ 260—438.1

TOBIAS E. LEVOW, *Primary Examiner.*

H. M. S. SNEED, *Assistant Examiner.*